United States Patent
Hass et al.

(10) Patent No.: US 12,394,168 B2
(45) Date of Patent: Aug. 19, 2025

(54) APPLICATION RECENTERING

(71) Applicant: Apple Inc., Cupertino, CA (US)

(72) Inventors: John R. Hass, San Francisco, CA (US); Peter L. Hajas, Lafayette, CO (US); Raffael Hannemann, Paris (DE); Reinhard Klapfer, San Bruno, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/672,911

(22) Filed: May 23, 2024

(65) Prior Publication Data

US 2024/0394993 A1 Nov. 28, 2024

Related U.S. Application Data

(60) Provisional application No. 63/469,117, filed on May 26, 2023.

(51) Int. Cl.
*G06T 19/00* (2011.01)
*G06F 3/02* (2006.01)
(Continued)

(52) U.S. Cl.
CPC ............ *G06T 19/20* (2013.01); *G06F 3/02* (2013.01); *G06F 3/0346* (2013.01);
(Continued)

(58) Field of Classification Search
CPC ............ G06T 19/20; G06T 2200/24; G06T 2219/2004; G06T 2219/2016;
(Continued)

(56) References Cited

U.S. PATENT DOCUMENTS

2015/0182855 A1* 7/2015 Tolk .................. A63F 13/428
463/31
2018/0315250 A1 11/2018 Poulos et al.
(Continued)

FOREIGN PATENT DOCUMENTS

WO 2019147392 A1 8/2019

*Primary Examiner* — Abdul-Samad A Adediran
(74) *Attorney, Agent, or Firm* — Fernando & Partners, LLP

(57) ABSTRACT

In one implementation, a method of recentering an application is performed by a device including a display, one or more processors, and non-transitory memory. The method includes obtaining a transform between a three-dimensional application coordinate system and a three-dimensional world coordinate system. The method includes determining a location of a virtual object in the three-dimensional application coordinate system. The method includes displaying, on the display, the virtual object at a location in a two-dimensional display coordinate system based on the location of the virtual object in the three-dimensional application coordinate system, the transform, and a first pose of the device. The method includes detecting a recentering trigger. The method includes in response to detecting a recentering trigger, updating the transform to an updated transform based on a second pose of the device. The method includes displaying, on the display, the virtual object at an updated location in the two-dimensional display coordinate system based on the location of the virtual object in the three-dimensional application coordinate system, the updated transform, and a third pose of the device.

20 Claims, 10 Drawing Sheets

(51) Int. Cl.
*G06F 3/0346* (2013.01)
*G06T 19/20* (2011.01)

(52) U.S. Cl.
CPC .. *G06T 2200/24* (2013.01); *G06T 2219/2004* (2013.01); *G06T 2219/2016* (2013.01)

(58) Field of Classification Search
CPC ....... G06T 19/006; G06F 3/02; G06F 3/0346; G06F 3/1454; A63F 13/428
USPC ............................................ 463/31; 715/733
See application file for complete search history.

(56) References Cited

U.S. PATENT DOCUMENTS

| | | |
|---|---|---|
| 2022/0092852 A1 | 3/2022 | Mohan et al. |
| 2023/0152935 A1* | 5/2023 | McKenzie ............ G06F 3/1454 715/733 |
| 2023/0410415 A1* | 12/2023 | Richter ................ G06T 19/006 |

\* cited by examiner

400

| At a device including a display, one or more processors, non-transitory memory:

Obtaining a transform between a three-dimensional application coordinate system and a three-dimensional world coordinate system | ⎯410 |

↓

Determining a location of a virtual object in a three-dimensional application coordinate system ⎯420

↓

Displaying, on the display, the virtual object at a location in a two-dimensional coordinate system based on the location of the virtual object in the three-dimensional application coordinate system, the transform, and a first pose of the device ⎯430

↓

Detecting a recentering trigger ⎯440

↓

In response to detecting a recentering trigger, updating the transform to an updated transform based on a second pose of the device ⎯450

↓

Displaying, on the display, the virtual object at a location in a two-dimensional coordinate system based on the location of the virtual object in the three-dimensional application coordinate system, the updated transform, and a third pose of the device ⎯460

Figure 4

APPLICATION RECENTERING

CROSS-REFERENCE TO RELATED APPLICATIONS

This application claims priority to U.S. Provisional Patent App. No. 63/469,117, filed on May 26, 2023, which is hereby incorporated by reference in its entirety.

TECHNICAL FIELD

The present disclosure generally relates to systems, methods, and devices of recentering an application in an extended reality (XR) environment.

BACKGROUND

In various implementations, an extended reality (XR) environment presented by an electronic device including a display includes virtual world-locked objects arranged in locations around a user according to the user's preference. When the user moves from a first location to a second location, the virtual world-locked objects maintain their positions proximate to the first location and may be far from the second location, reducing their usability.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4 is a flowchart representation of a method of displaying an image in accordance with some implementations.

Figure 1:
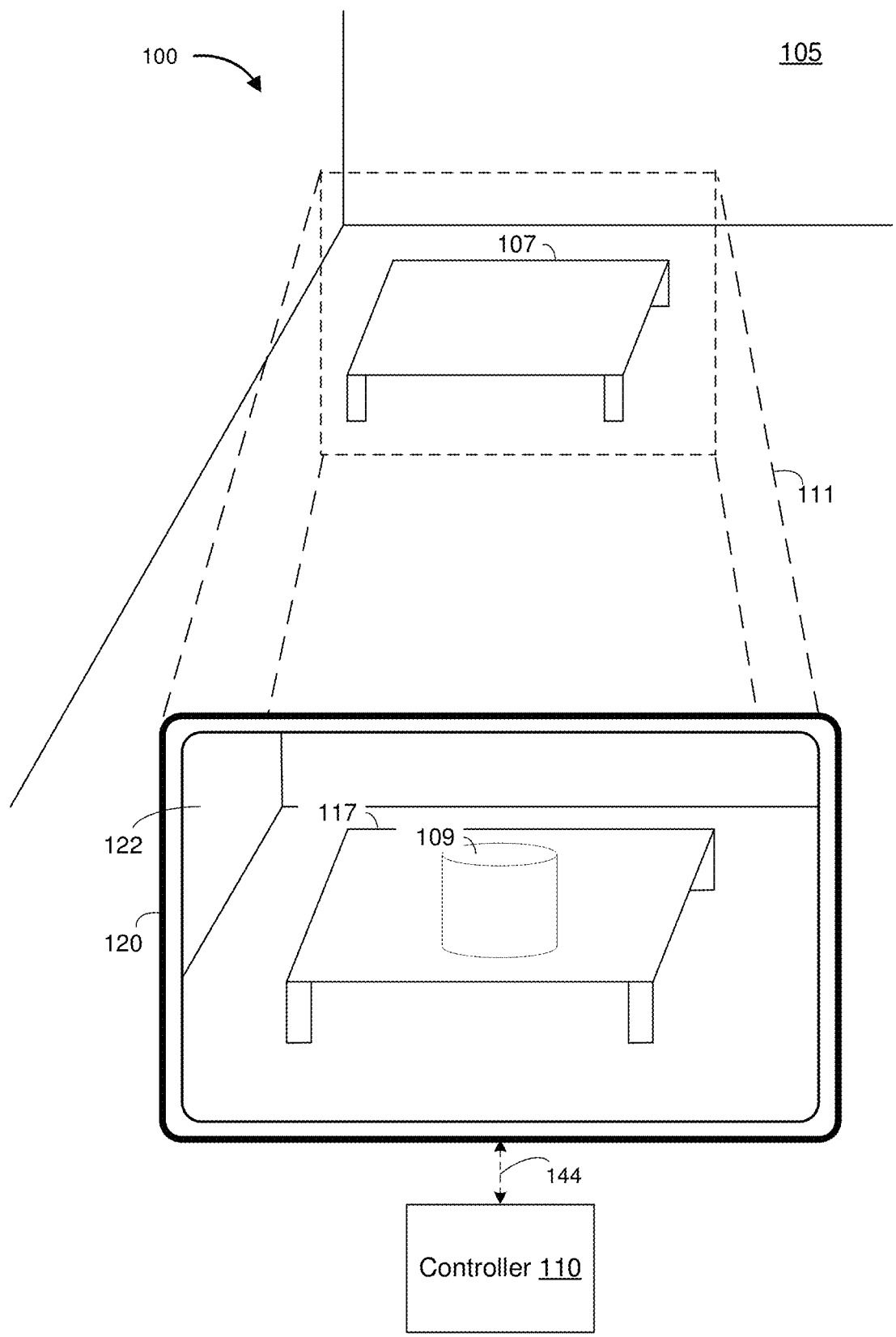
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for recentering an application. In various implementations, the method is performed by a device including a display, one or more processors, and non-transitory memory. The method includes obtaining a transform between a three-dimensional application coordinate system and a three-dimensional world coordinate system. The method includes determining a location of a virtual object in the three-dimensional application coordinate system. The method includes displaying, on the display, the virtual object at a location in a two-dimensional display coordinate system based on the location of the virtual object in the three-dimensional application coordinate system, the transform, and a first pose of the device. The method includes detecting a recentering trigger. The method includes in response to detecting a recentering trigger, updating the transform to an updated transform based on a second pose of the device. The method includes displaying, on the display, the virtual object at an updated location in the two-dimensional display coordinate system based on the location of the virtual object in the three-dimensional application coordinate system, the updated transform, and a third pose of the device.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

As noted above, in various implementations, virtual world-locked objects arranged in locations in an XR environment around a user at a first location in the XR environment according to the user's preference may be far from the user when the user moves from a first location to a second location in the XR environment. Accordingly, in various implementations, when a recentering trigger is detected, the locations in the XR environment of the world-locked objects are changed to be closer to the second location and may, in various implementations, remain arranged according to the user's preference.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 5. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 6.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

FIGS. 2A-2E illustrate an XR environment 200 based on a physical environment of a home office from the perspective of a user of an electronic device displayed, at least in part, by a display of the electronic device. In various implementations, the electronic device includes multiple displays (e.g., a left display positioned in front of a left eye of a user and a right display positioned in front of a right eye of the user) configured to provide a stereoscopic view of the XR environment 200. For ease of illustration, FIGS. 2A-2E illustrate the XR environment 200 as presented on a single one of the multiple displays.

In various implementations, the perspective of the user is from a location of an image sensor of the electronic device. For example, in various implementations, the electronic device is a handheld electronic device and the perspective of the user is from a location of the image sensor of the handheld electronic device directed towards the physical environment. In various implementations, the perspective of the user is from the location of a user of the electronic device. For example, in various implementations, the electronic device is a head-mounted electronic device and the perspective of the user is from a location of the user directed towards the physical environment, generally approximating the field-of-view of the user if the head-mounted electronic device were not present. In various implementations, the perspective of the user is from the location of an avatar of the user. For example, in various implementations, the XR environment 200 is a virtual environment and the perspective of the user is from the location of an avatar or other representation of the user directed towards the virtual environment.

FIGS. 2A-2E illustrate the XR environment 200 during a series of time periods. In various implementations, each time period is an instant, a fraction of a second, a few seconds, a few hours, a few days, or any length of time.

The XR environment 200 includes a plurality of objects, including one or more real objects (e.g., a table 211 and a laptop 212 on the table 211) and one or more virtual objects (e.g., a virtual clock 221, virtual flowers 222, a first virtual widget 223, a second virtual widget 224, and a virtual window 225). In various implementations, certain objects (such as the virtual flowers 222, the first virtual widget 223, the second virtual widget 224, and the virtual window 225) are displayed at a location in the XR environment 200, e.g., at a location defined by three coordinates in a three-dimensional (3D) XR coordinate system. Accordingly, when the electronic device moves in the XR environment 200 (e.g., changes either position and/or orientation), the objects are moved on the display of the electronic device, but retain their (possibly time-dependent) location in the XR environment 200. Such virtual objects that, in response to motion of the electronic device, move on the display, but retain their position in the XR environment 200 are referred to as world-locked objects. In various implementations, certain virtual objects (such as the virtual clock 221) are displayed at locations on the display such that when the electronic device moves in the XR environment 200, the objects are stationary on the display on the electronic device. Such virtual objects that, in response to motion of the electronic device, retain their location on the display are referred to as head-locked objects or display-locked objects.

Figure 2A:
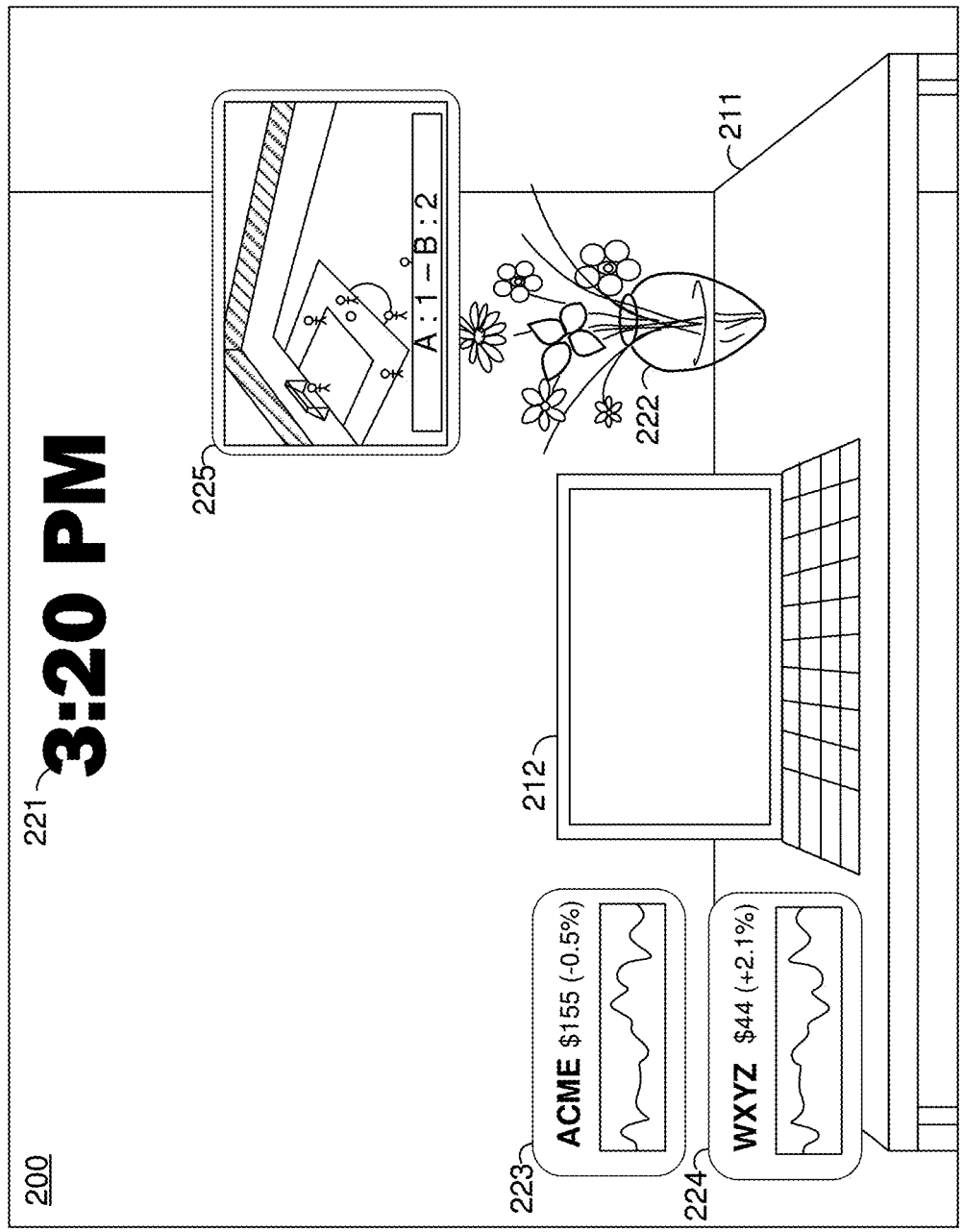
FIGS. 2A-2E illustrate an XR environment during various time periods in accordance with some implementations.

FIG. 2A illustrates the XR environment 200 during a first time period. During the first time period, the electronic device has a first pose. Before the first time period, while the device had the first pose, a clock application was launched to trigger the display of the virtual clock 221, a décor application was launched to trigger the display of the virtual flowers 222, the stock tracking application was launched to trigger display of the first virtual widget 223 and the second virtual widget 224, and a television application was launched to display the virtual window 225.

During the first time period, the electronic device displays the virtual clock 221 at a fixed clock location on the display. In various implementations, the fixed clock location is determined by a setting stored by the clock application that indicates a location on the display. During the first time period, the electronic device displays the virtual flowers 222 at a first flowers location on the display corresponding to, for the first pose of the electronic device, a flowers location in the XR environment 200, e.g., a location on the table 211. In various implementations, the flowers location in the XR environment 200 is determined by a setting stored by the flowers application that indicates an absolute location in the XR environment 200 (e.g., a set of three-dimensional coordinates in the XR coordinate system).

During the first time period, the electronic device displays the first virtual widget 223 at a first widget location on the display corresponding to, for the first pose of the electronic device, a first widget location in the XR environment 200. During the first time period, the electronic device displays the second virtual widget 224 at a second widget location on the display corresponding to, for the first pose of the electronic device, a second widget location in the XR environment 200. In various implementations, the first widget location in the XR environment 200 and the second widget location in the XR environment 200 are determined based on settings stored by the stock tracking application that indicate relative locations in the XR environment 200 of the virtual widgets relative to a pose of the device when the stock tracking application is launched. For example, the settings may indicate that the first widget location in the XR environment 200 is two feet in front of the device and one foot to the left when the stock tracking application is launched.

During the first time period, the electronic device displays the virtual window 225 at a first window location on the display corresponding to, for the first pose of the electronic device, a first window location in the XR environment 200. In various implementations, the first window location in the XR environment 200 is configured by a user after launching the television application (e.g., the virtual window 225 has been moved and/or resized).

Figure 2B:
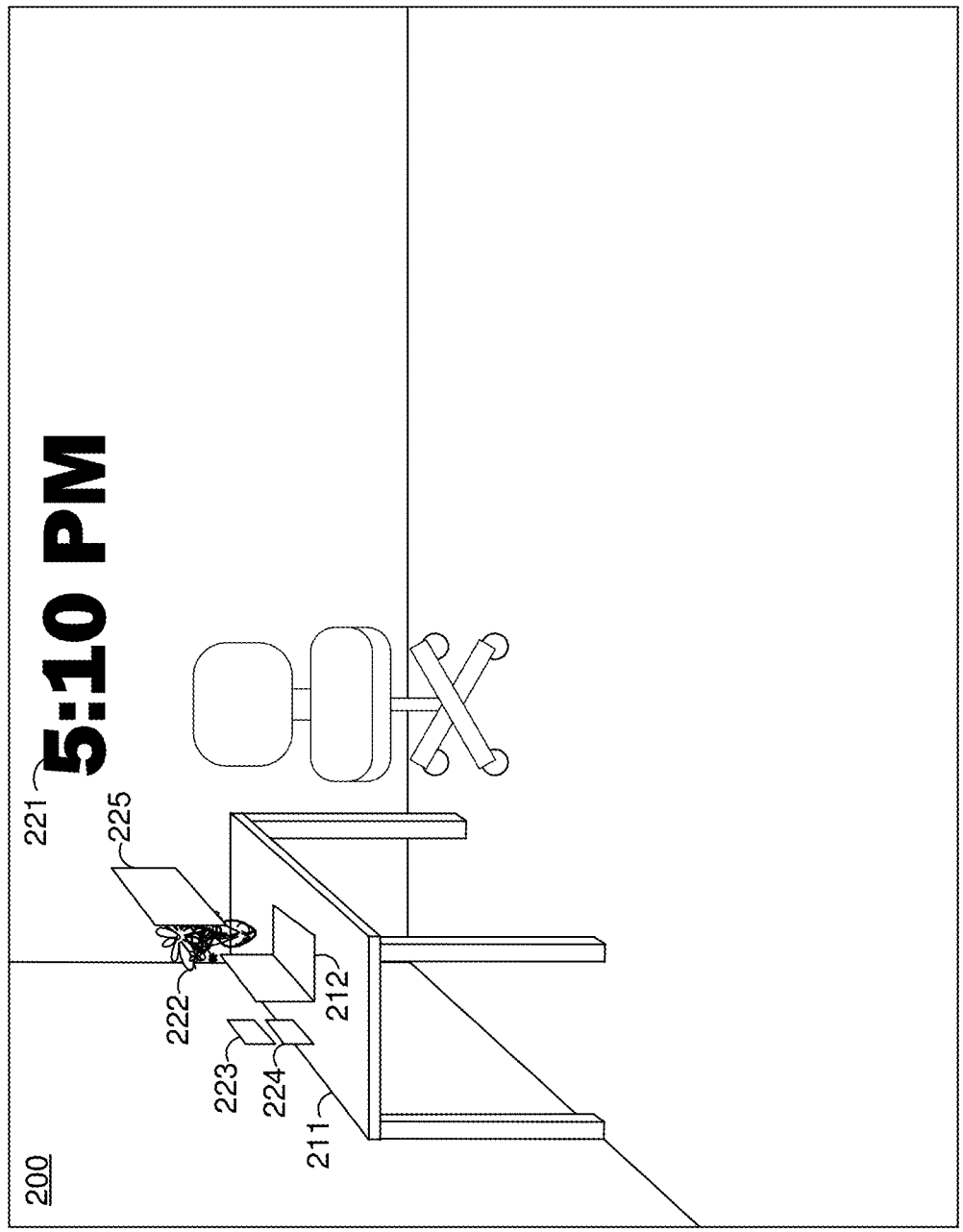

FIG. 2B illustrates the XR environment 200 during a second time period subsequent to the first time period. During the second time period, as compared to the first time period, the pose of the electronic device has changed from the first pose to a second pose. In particular, the electronic device has moved to a new location in the home office. During the second time period, the electronic device displays the virtual clock 221 at the fixed clock location on the display. During the second time period, the electronic device displays the virtual flowers 222 at a second flowers location on the display corresponding to, for the second pose of the electronic device, the flowers location in the XR environment 200, e.g., the location on the table 211. During the second time period, the electronic device displays the first virtual widget 223 at a third widget location on the display corresponding to, for the second pose of the electronic device, the first widget location in the XR environment 200. During the second time period, the electronic device displays the second virtual widget 224 at a fourth widget location on the display corresponding to, for the second pose of the electronic device, the second widget location in the XR environment 200. During the second time period, the electronic device displays the virtual window 225 at a second window location on the display corresponding to, for the second pose of the electronic device, the first window location in the XR environment 200.

As illustrated by FIG. 2B, the first virtual widget 223, the second virtual widget 224, and the virtual window 225 are displayed over a small portion of the display because their relative locations in the XR environment 200 are far from the electronic device. This small (and oblique) display makes reading information displayed by the virtual first widget 223 or virtual second widget 224 or consuming content displayed by the virtual window 225 difficult.

Accordingly, in various implementations, after the second time period, a recentering trigger is detected. In various implementations, the recentering trigger is detected when a user inputs a recentering request. For example, in various implementations, the recentering request is input via a button of the electronic device. As another example, in various implementations, the recentering request is a vocal input. In various implementations, the recentering trigger is detected in response to determining that the electronic device moved at least a threshold distance and was subsequently substantially stationary for at least a threshold amount of time. In various implementations, the recentering trigger is detected when the electronic device is booted. In various implementations, the recentering trigger is detected when a SLAM (simultaneous localization and mapping) delocalization occurs.

At launch, each application is associated with a three-dimensional application coordinate system and a transform between the application coordinate system and the three-dimensional XR coordinate system based on the pose of the electronic device at launch. In response to a recentering request, at least one application is recentered by transforming the corresponding application coordinate system based on a difference between the pose of the electronic device at launch and the pose of the electronic device when the recentering trigger is detected. For example, if the application coordinate system had an origin at the location of the electronic device at launch, the application coordinate system is transformed to have an origin at the location of the electronic device when the recentering trigger is detected. As another example, if the application coordinate system had an origin at a particular angle with and a particular distance from to the electronic device at launch, the application coordinate system is transformed to have an origin at the particular angle with and the particular distance from the electronic device when the recentering trigger is detected.

Figure 2C:
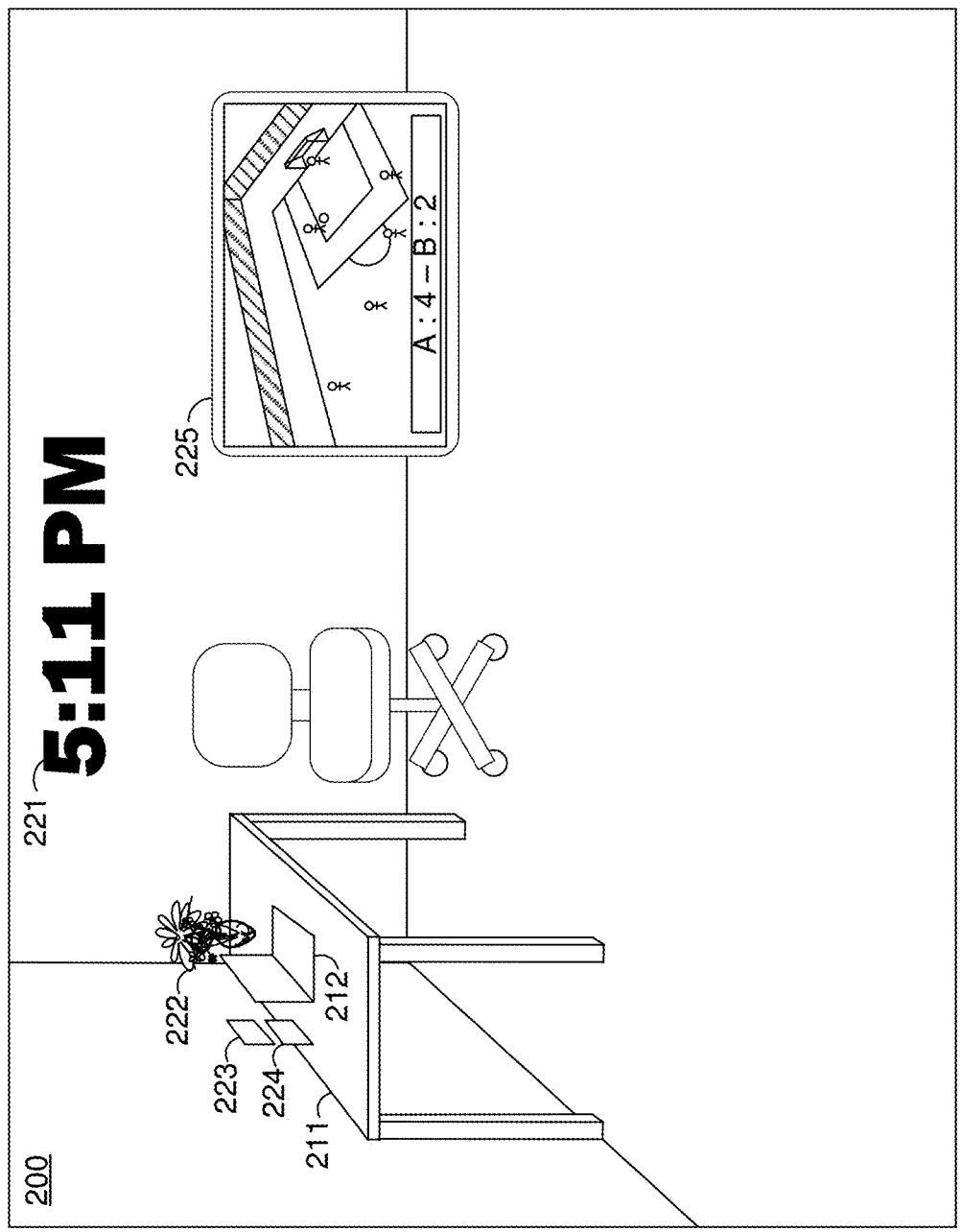
Figure 2D:
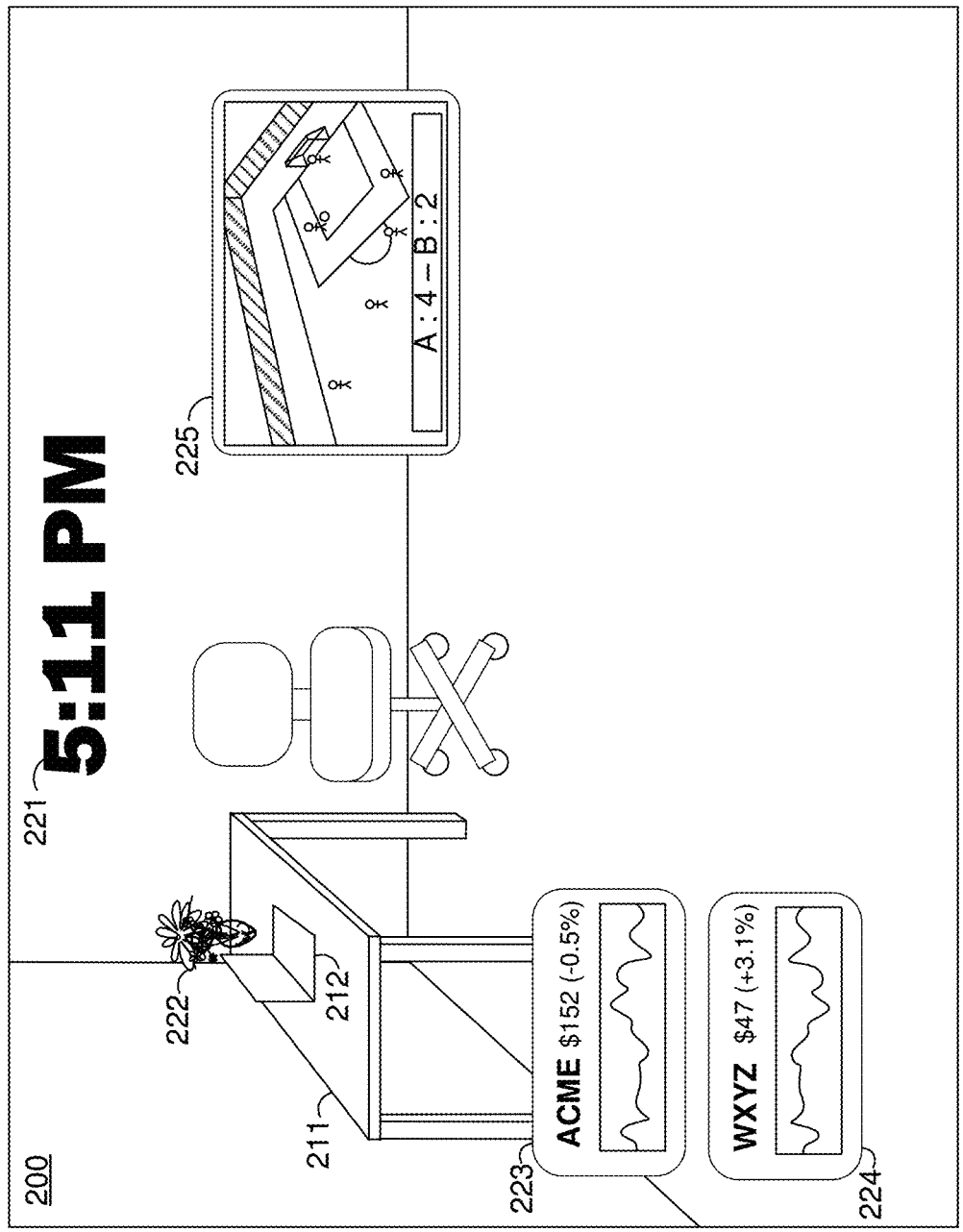

In various implementations, a current application is recentered in response to detecting the recentering trigger. In various implementations, all executing applications are recentered in response to detecting the recentering trigger. In various implementations, and as illustrated in FIGS. 2C and 2D, in response to a first recentering trigger (e.g., holding a button for at least a first threshold amount of time), a current application is recentered and in response to a second recentering trigger (e.g., continuing to hold the button for at least a second threshold of time), all executing applications are recentered. In various implementations, in addition to recentering one or more applications, in response to the recentering trigger, the electronic device provides feedback regarding the recentering, such as a notification that the recentering trigger has been detected and/or that the recentering has been completed.

FIG. 2C illustrates the XR environment 200 during a third time period subsequent to the second time period after a first recentering trigger is detected. In response to detecting the first recentering trigger, a current application (e.g., the television application) is recentered. During the third time period, as compared to the second time period, the electronic device displays the virtual window 225 at the first window location on the display corresponding to, for the second pose of the electronic device, a second window location in the XR environment 200. Because the electronic device had the same pose at launch of the television application (during the first time period of FIG. 2A) as at detection of the first recentering request (during the third time period of FIG. 2C), the location on the display during the first time period and the third time period is the same. However, during the first time period, the virtual window 225 is displayed at a first window location in the XR environment 200 and, during the third time period, the virtual window 225 is displayed at a second window location in the XR environment 200. For example, as a world-locked object, were the electronic device to move during the first time period, the location of virtual window 225 on the display would change (in a corresponding manner to the change in the location on the display of the XR environment 200) to maintain the first window location in the XR environment 200 and, were the electronic device to move during the third time period, the location of the virtual window 225 on the display would change (in a corresponding manner to the change in the location on the display of the XR environment 200) to maintain the second window location in the XR environment 200.

FIG. 2D illustrates the XR environment 200 during a fourth time period subsequent to the third time period after a second recentering trigger is detected. In response to detecting the second recentering trigger, all executing applications are recentered. During the fourth time period, the electronic device displays the virtual clock 221 at the fixed clock location on the display. Although the clock application has been recentered, the virtual clock 221 is a display-locked object and does not change its location on the display in response to the second recentering trigger. During the fourth time period, the electronic device displays the virtual flowers 222 at the second flowers location on the display corresponding to, for the second pose of the electronic device, the flowers location in the XR environment 200, e.g., the location on the table 211. Although the décor application has been recentered, in addition to transforming the application coordinate system of the décor application, the electronic device oppositely transforms the location of the virtual flowers 222 in the application coordinate system of the décor application so that the virtual flowers 222 maintain their location in the XR environment 200.

During the fourth time period, the electronic device displays the first virtual widget 223 at the first widget location on the display corresponding to, for the second pose of the electronic device, a third widget location in the XR environment 200. During the fourth time period, the electronic device displays the second virtual widget 224 at the second widget location on the display corresponding to, for the second pose of the electronic device, a fourth widget location in the XR environment 200. During the fourth time period, the electronic device displays the virtual window 225 at the first window location on the display corresponding to, for the second pose of the electronic device, the second window location in the XR environment 200.

Figure 2E:
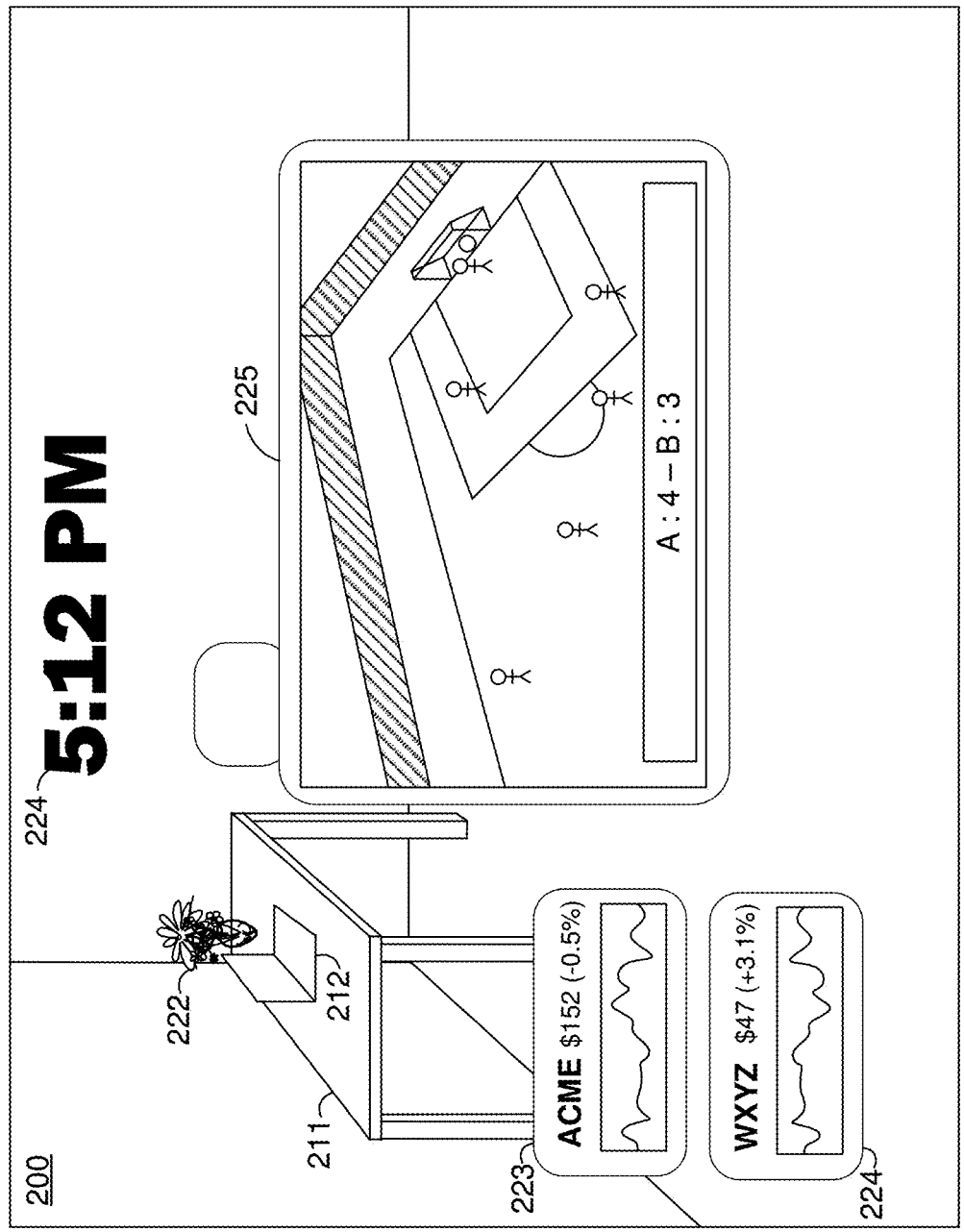

FIG. 2E illustrates the XR environment during a fifth time period subsequent to the fourth time period. Between the fourth time period and the fifth time period, the virtual window 225 has been moved in the XR environment 200 (from the second window location in the XR environment 200 to a third window location in the XR environment) and resized. Accordingly, during the fifth time period, as compared to the fourth time period, the electronic device displays the virtual window 225 at a third window location on the display corresponding to, for the second pose of the electronic device, a third window location in the XR environment 200.

Figure 3:
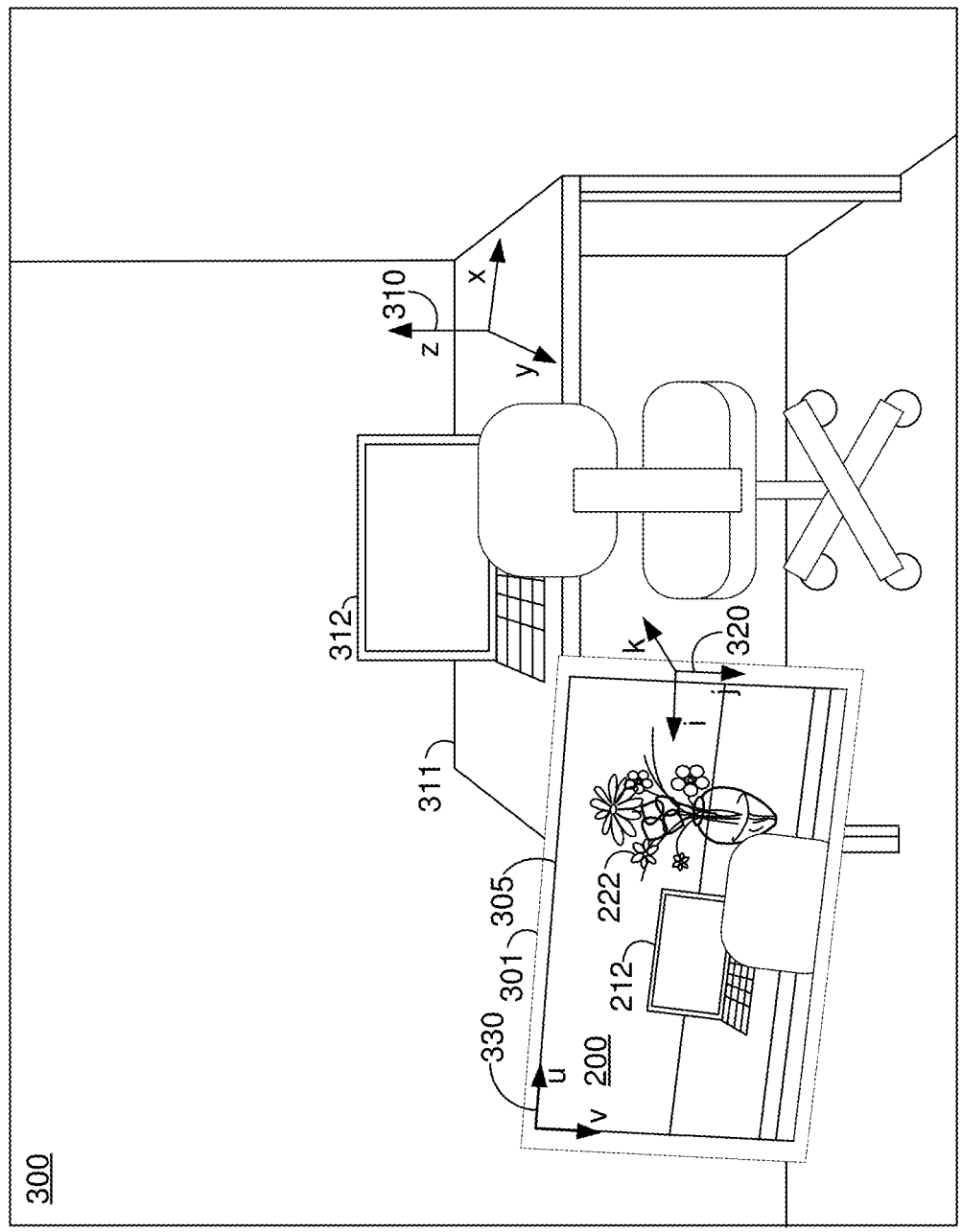
FIG. 3 illustrates an electronic device in accordance with some implementations.

FIG. 3 illustrates the physical environment 300 of the home office. The physical environment 300 includes a physical table 311 and a physical laptop 312 on the physical table 311. The physical environment 300 further includes the electronic device 301 displaying the XR environment 200 on a display 305 of the electronic device 301. As noted above, in various implementations, the electronic device 301 includes multiple displays to provide a stereoscopic view of the XR environment 200. For ease of illustration, only a single display 305 is illustrated in FIG. 3.

The physical environment 300 is associated with a three-dimensional physical-environment coordinate system (represented by the axes 310) in which a point in the physical-environment coordinate system includes an x-coordinate, a y-coordinate, and a z-coordinate. The electronic device 301 includes a camera directed towards the physical table 311 and the physical laptop 312. The camera is associated with a three-dimensional camera coordinate system (represented by the axes 320) in which a point in the camera coordinate system includes an i-coordinate, a j-coordinate, and a k-coordinate. In various implementations, the k-axis of the camera coordinate system corresponds to the optical axis of the camera. The physical-environment coordinate system and the camera coordinate system are related by a transform based on the pose (e.g., the three-dimensional location and three-dimensional orientation) of the camera (and the electronic device 301) in the physical-environment coordinate system. In particular, the physical-environment coordinate system and the camera coordinate system are related by a camera rotation-and-translation transform which changes based on the pose of the electronic device 301. Thus, when the three-dimensional coordinates of a point in the physical-environment coordinate system and the pose of the electronic device 301 in the physical-environment coordinate system are known, the three-dimensional coordinates of the point in the camera coordinate system can be determined.

Further, the display 305 of the electronic device 301 is associated with a two-dimensional display coordinate system (represented by the axes 330) in which a point in the display coordinate system includes a u-coordinate and a v-coordinate. The camera coordinate system and the display coordinate system are related by a transform based on the intrinsic parameters of the camera. In particular, the camera coordinate system and the display coordinate system are related by a camera perspective projection transform. Thus, when the three-dimensional coordinates of a point in the camera coordinate system and the intrinsic parameters of the camera are known, the two-dimensional coordinates of the point in the display coordinate system can be determined. In various implementations, the i-axis is parallel to the u-axis and the j-axis is parallel to the v-axis.

As described above, in various implementations, the electronic device 301 includes multiple displays. In various implementations, each of the multiple displays has a respective two-dimensional display coordinate system related to the camera coordinate system by a respective camera perspective projection transform. Further, in various implementations, the electronic device 301 includes multiple cameras, each with a respective three-dimensional camera coordinate system related to a corresponding two-dimensional display coordinate system by a corresponding camera perspective projection transform.

In various implementations, a representation of a physical object may be displayed at a location on the display 305 corresponding to the location of the physical object in the physical environment 300. For example, in FIG. 3, the laptop 212 is displayed at a location on the display 305 corresponding to the location in the physical environment of the physical laptop 312. Similarly, a virtual object may be displayed at a location on the display 305 corresponding to a location in the physical environment 300. For example, in FIG. 3, the virtual flowers 222 are displayed at a location on the display 305 corresponding to a location in the physical environment 300 on the physical table 311. Because the location on the display is related to the location in the physical environment using a transform based on the pose of the electronic device 301, as the electronic device 301 moves in the physical environment 300, the location on the display 305 of the laptop 212 changes. Similarly, as the electronic device 301 moves, the electronic device 301 correspondingly changes the location on the display 305 of the virtual flowers 222 such that they appear to maintain their location in the physical environment 300 on the physical table 311. As noted above, a virtual object that, in response to movement of the electronic device 301, changes location on the display 305 to maintain its appearance at the same location in the physical environment 300 may be referred to as a "world-locked" virtual object.

To render a world-locked virtual object, the electronic device 301 determines one or more sets of three-dimensional coordinates in the physical-environment coordinate system for the virtual object (e.g., a set of three-dimensional coordinates in the physical-environment coordinate system for each vertex of the virtual object). The electronic device 301 transforms the one or more sets of three-dimensional coordinates in the physical-environment coordinate system into one or more sets of three-dimensional coordinates in the camera coordinate system using the camera rotation-and-translation transform (which changes based on the pose of the electronic device 301). The device transforms the one or more sets of three-dimensional coordinates in the camera coordinate system into one or more sets of two-dimensional coordinates in the display coordinate system using the camera perspective projection transform. Finally, the electronic device 301 renders the virtual object on the display 305 using the two-dimensional coordinates in the display coordinate system. In various implementations, the camera rotation-and-translation transform and the camera perspective projection transform are combined into a single camera transform.

In various implementations, each application is associated with a three-dimensional application coordinate system that, like the physical-environment coordinate system, does not move as the electronic device 301 moves in the physical environment 300. In various implementations, the application coordinate system is based on the camera coordinate system at the time the application is launched. For example, in various implementations, the application coordinate system is equal to the camera coordinate system at the time the application is launched. As another example, in various implementations, the application coordinate system is related to the camera coordinate system at the time the application is launched by a known rotation-and-translation transform.

Each application coordinate system is related to the physical-environment coordinate system by a respective application rotation-and-translation transform that does not change as the electronic device 301 moves in the physical environment 300. Similarly, each application coordinate system is related to the camera coordinate system by a combination of the application rotation-and-translation transform (which does not change as the electronic device 301 moves in the physical environment 300) and the camera rotation-and-translation transform (which changes as the electronic device 301 moves in the physical environment 300).

In various implementations, to render a world-locked virtual object, the electronic device 301 determines one or more sets of three-dimensional coordinates in the application coordinate system for the virtual object. The electronic device 301 transforms the sets of three-dimensional coordinates in the application system into one or more sets of three-dimensional coordinates in the physical-environment coordinate system using the respective application rotation-and-translation transform. The electronic device 301 transforms the one or more sets of three-dimensional coordinates in the physical-environment coordinate system into one or more sets of three-dimensional coordinates in the camera coordinate system using the camera rotation-and-translation transform based on the pose of the electronic device 301. The electronic device 301 transforms the one or more sets of three-dimensional coordinates in the camera coordinate system into one or more sets of two-dimensional coordinates in the display coordinate system using the camera perspective projection transform. Finally, the electronic device 301 renders the virtual object on the display 305 using the two-dimensional coordinates in the display coordinate system. In various implementations, the respective application rotation-and-translation transform, the camera rotation-and-translation transform, and the camera perspective projection transform are combined into a single camera transform.

In response to detecting a recentering trigger, the one or more application coordinate systems are redefined. In various implementations, the application coordinate system is redefined based on the camera coordinate system at the time the recentering trigger is detected. For example, in various implementations, the application coordinate system is redefined to be equal to the camera coordinate system at the time the recentering trigger is detected. As another example, in various implementations, the application coordinate system is redefined to be related to the camera coordinate system at the time the recentering trigger is detected by the known rotation-and-translation transform.

After the application coordinate system is redefined, the application coordinate system and the physical-environment coordinate system are related by an updated application rotation-and-translation transform. Thus, when the sets of three-dimensional coordinates in the application coordinate system of a world-locked virtual object are unchanged, rendering the world-locked virtual object includes transforming the sets of three-dimensional coordinates in the application system into one or more sets of three-dimensional coordinates in the physical-environment coordinate system using the updated application rotation-and-translation transform and the virtual object is displayed on a different portion of the display 305.

However, in various implementations, certain virtual objects are anchored to an anchor location in the physical environment 300. For example, the virtual flowers 222 are displayed at a location on the physical table 311. Upon recentering the décor application, it is desirable that the virtual flowers 222 remain displayed at the anchor location in the physical environment 300. Thus, in various implementations, in response to detecting a recentering trigger, in addition to moving the application coordinate system, the three-dimensional coordinates of the anchor location in the application coordinate system are oppositely moved. Thus, the sets of three-dimensional coordinates in the application coordinate system of the virtual flowers 222 are changed in response to detecting the recentering request so that the virtual flowers 222 remain displayed at the anchor location in the physical environment 300.

FIG. 4 is a flowchart representation of a method 400 of recentering an application in accordance with some implementations. In various implementations, the method 400 is performed by an electronic device, such as the electronic device 120 of FIG. 1 or the electronic device 301 of FIG. 3. In various implementations, the method 400 is performed by a device with a display, one or more processors, and non-transitory memory. In some implementations, the method 400 is performed by processing logic, including hardware, firmware, software, or a combination thereof. In some implementations, the method 400 is performed by a processor executing instructions (e.g., code) stored in a non-transitory computer-readable medium (e.g., a memory).

The method 400 begins, in block 410, with the device obtaining a transform between a three-dimensional application coordinate system and a three-dimensional world coordinate system. In various implementations, the transform is a rotation-and-translation transform. For example, in various implementations, the transform is stored as a set of three angles and three distances. In various implementations, the transform is based on a pose of the device at a time an application is launched.

The method 400 continues, in block 420, with the device determining a location of a virtual object in the three-dimensional application coordinate system. In various implementations, determining the location of the virtual object in the three-dimensional application coordinate system includes determining one or more sets of three-dimensional coordinates in the application coordinate system. In various implementations, the one or more sets of three-dimensional coordinates in the application coordinate system includes an anchor location. In various implementations, the one or more sets of three-dimensional coordinates in the application coordinate system includes locations of one or more vertices of the virtual object.

The method 400 continues, in block 430, with the device displaying, on the display, the virtual object at a location in a two-dimensional display coordinate system based on the location of the virtual object in the three-dimensional application coordinate system, the transform, and a first pose of the device. In various implementations, displaying the virtual object at the location in the two-dimensional display coordinate system includes determining a location of the virtual object in the three-dimensional world coordinate system based on the location of the virtual object in the three-dimensional application coordinate system and the transform and determining the location of the virtual object in the two-dimensional display coordinate system based on the location of the virtual object in the three-dimensional world coordinate system and the first pose of the device. In various implementations, determining the location of the virtual object in the two-dimensional display coordinate system includes determining the location of the virtual object in a three-dimensional camera coordinate system based on the first pose of the device (e.g., using a camera rotation-and-translation transform) and determining the location of the virtual object in the two-dimensional display coordinate system based on the location on the virtual object in the three-dimensional camera coordinate system and intrinsic parameters of a camera (e.g., using a camera perspective projection transform). In various implementations, the first pose of the device is an estimated pose of the device at a display time at which the virtual object is displayed at the location in the two-dimensional display coordinate system.

In various implementations, the virtual object is a world-locked virtual object. Thus, as the device moves in three-dimensional world coordinate system, the location of the virtual object in the two-dimensional display coordinate system changes. Thus, in various implementations, the method 400 further includes displaying, on the display, the virtual object at a different location in the two-dimensional display coordinate system based on the location of the virtual object in the three-dimensional application coordinate system, the transform, and a different first pose of the device.

The method 400 continues, in block 440, with the device detecting a recentering trigger. In various implementations, detecting the recentering trigger includes detecting a user input. For example, in various implementations, the user input includes pressing a physical button. As another example, in various implementations, the user input includes a vocal command. In various implementations, detecting the recentering trigger is based on a location of the device in the application coordinate system. For example, in various implementations, the device detects the recentering trigger when a user moves from a first location when the application is launched to a second location at least a threshold distance from the first location and has settled into the second location. Thus, in various implementations, the device detects the recentering trigger when the device has moved at least a threshold distance and has been substantially stationary for at least a threshold amount of time.

The method 400 continues, in block 450, with the device, in response to detecting the recentering trigger, updating the transform to an updated transform based on a second pose of the device. In various implementations, the second pose of the device is an estimated pose of the device at a trigger time at which the recentering request was detected. In various implementations, the second pose is different than the first pose. In various implementations, the second pose is the same as the first pose.

The method 400 continues, in block 460, with the device, displaying, on the display, the virtual object at an updated location in the two-dimensional display coordinate system based on the location of the virtual object in the three-dimensional application coordinate system, the updated transform, and a third pose of the device. In various implementations, displaying the virtual object at the updated location in the two-dimensional display coordinate system includes determining a location of the virtual object in the three-dimensional world coordinate system based on the location of the virtual object in the three-dimensional application coordinate system and the updated transform and determining the location of the virtual object in the two-dimensional display coordinate system based on the location of the virtual object in the three-dimensional world coordinate system and the third pose of the device. In various implementations, determining the location of the virtual object in the two-dimensional display coordinate system includes determining the location of the virtual object in a three-dimensional camera coordinate system based on the third pose of the device (e.g., using a camera rotation-and-translation transform) and determining the location of the virtual object in the two-dimensional display coordinate system based on the location on the virtual object in the three-dimensional camera coordinate system and intrinsic parameters of a camera (e.g., using a camera perspective projection transform).

In various implementations, the third pose of the device is an estimated pose of the device at an updated display time at which the virtual object is displayed at the updated location in the two-dimensional display coordinate system. In various implementations, the third pose is different than the second pose. In various implementations, the third pose is the same as the second pose.

As noted above, in various implementations, the virtual object is a world-locked virtual object. Thus, as the device moves in the three-dimensional world coordinate system, the location of the virtual object in the two-dimensional display coordinate system changes. Thus, in various implementations, the method 400 further includes displaying, on the display, the virtual object at a different updated location in the two-dimensional display coordinate system based on the location of the virtual object in the three-dimensional application coordinate system, the updated transform, and a different third pose of the device.

In various implementations, the method 400 includes, in response to detecting the recentering trigger, updating the location of the virtual object in the three-dimensional application coordinate system. In various implementations, the method 400 includes, in response to detecting the recentering trigger, updating an additional transform between an additional three-dimensional application coordinate system and the three-dimensional world coordinate system. Thus, in various implementations, in response to detecting the recentering trigger, multiple applications are recentered.

As noted above, in various implementations, the device includes multiple displays, such as a left eye display and a right eye display. Accordingly, in various implementations, the method 400 further includes displaying, on a second display, the virtual object at a location in a two-dimensional display coordinate system of the second display based on the location of the virtual object in the three-dimensional application coordinate system, the transform, and a first pose of the device. The method 400 further includes displaying, on the second display, the virtual object at an updated second location in the two-dimensional display coordinate system of the second display based on the location of the virtual object in the three-dimensional application coordinate system, the updated transform, and a third pose of the device.

Figure 5:
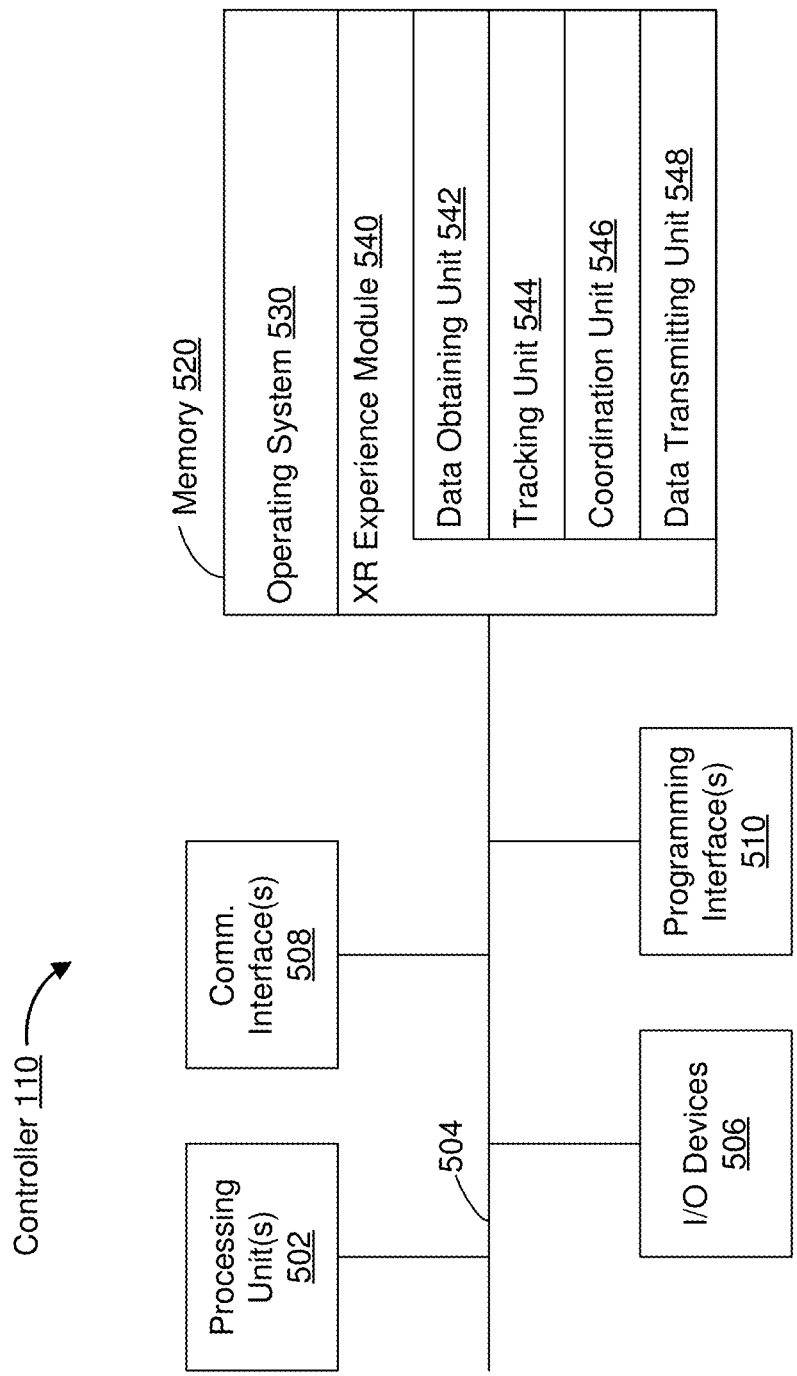
FIG. 5 is a block diagram of an example controller in accordance with some implementations.

FIG. 5 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 502 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 506, one or more communication interfaces 508 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 510, a memory 520, and one or more communication buses 504 for interconnecting these and various other components.

In some implementations, the one or more communication buses 504 include circuitry that interconnects and controls communications between system components. In some implementations, the one or more I/O devices 506 include at least one of a keyboard, a mouse, a touchpad, a joystick, one or more microphones, one or more speakers, one or more image sensors, one or more displays, and/or the like.

The memory 520 includes high-speed random-access memory, such as dynamic random-access memory (DRAM), static random-access memory (SRAM), double-data-rate random-access memory (DDR RAM), or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores the following programs, modules and data structures, or a subset thereof including an optional operating system 530 and an XR experience module 540.

The operating system 530 includes procedures for handling various basic system services and for performing hardware dependent tasks. In some implementations, the XR experience module 540 is configured to manage and coordinate one or more XR experiences for one or more users (e.g., a single XR experience for one or more users, or multiple XR experiences for respective groups of one or more users). To that end, in various implementations, the XR experience module 540 includes a data obtaining unit 542, a tracking unit 544, a coordination unit 546, and a data transmitting unit 548.

In some implementations, the data obtaining unit 542 is configured to obtain data (e.g., presentation data, interaction data, sensor data, location data, etc.) from at least the electronic device 120 of FIG. 1. To that end, in various implementations, the data obtaining unit 542 includes instructions and/or logic therefor, and heuristics and metadata therefor.

In some implementations, the tracking unit 544 is configured to map the physical environment 105 and to track the position/location of at least the electronic device 120 with respect to the physical environment 105 of FIG. 1. To that end, in various implementations, the tracking unit 544 includes instructions and/or logic therefor, and heuristics and metadata therefor.

In some implementations, the coordination unit 546 is configured to manage and coordinate the XR experience presented to the user by the electronic device 120. To that end, in various implementations, the coordination unit 546 includes instructions and/or logic therefor, and heuristics and metadata therefor.

In some implementations, the data transmitting unit 548 is configured to transmit data (e.g., presentation data, location data, etc.) to at least the electronic device 120. To that end, in various implementations, the data transmitting unit 548 includes instructions and/or logic therefor, and heuristics and metadata therefor.

Although the data obtaining unit 542, the tracking unit 544, the coordination unit 546, and the data transmitting unit 548 are shown as residing on a single device (e.g., the controller 110), it should be understood that in other implementations, any combination of the data obtaining unit 542, the tracking unit 544, the coordination unit 546, and the data transmitting unit 548 may be located in separate computing devices.

Moreover, FIG. 5 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 6:
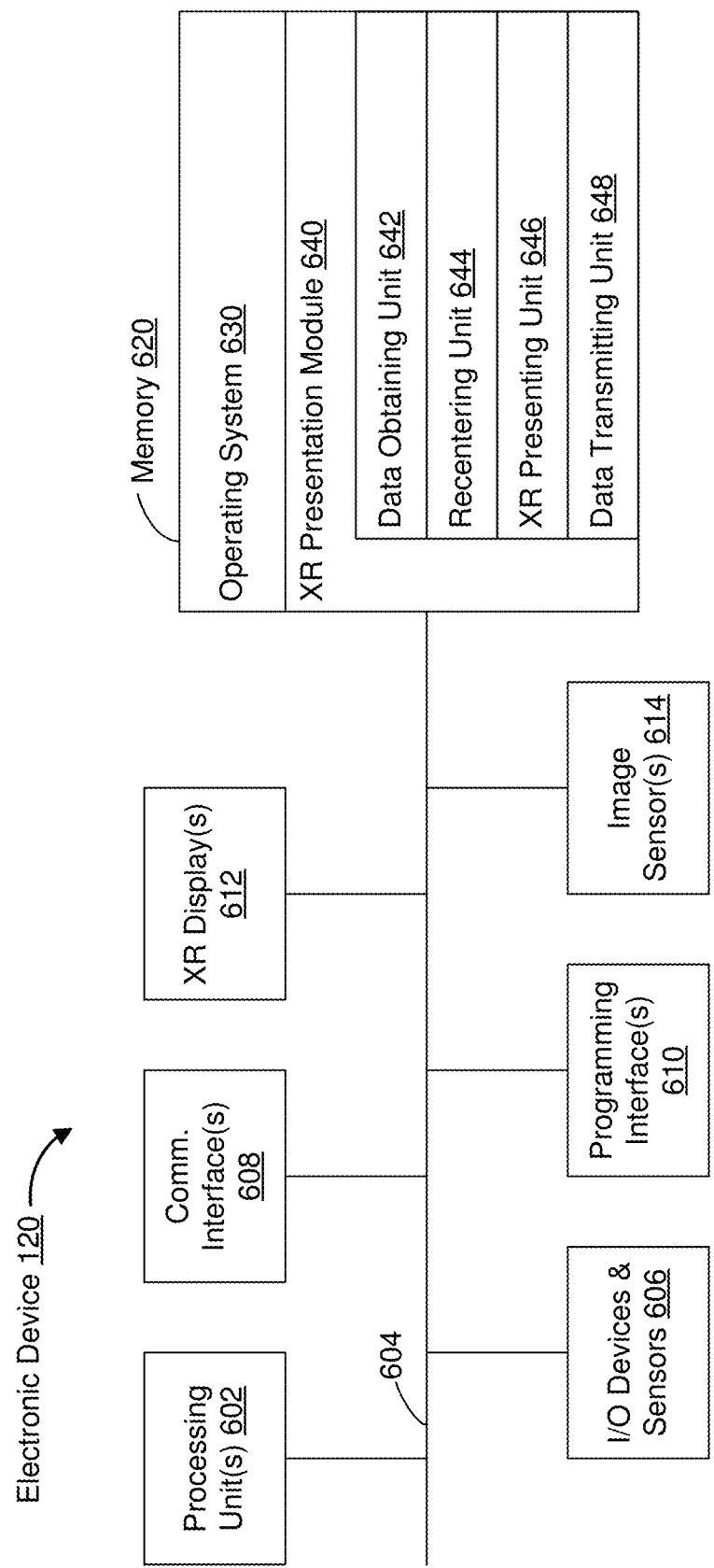
FIG. 6 is a block diagram of an example electronic device in accordance with some implementations.

FIG. 6 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 602 (e.g., microprocessors, ASICs, FPGAs, GPUs, CPUs, processing cores, and/or the like), one or more input/output (I/O) devices and sensors 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 610, one or more XR displays 612, one or more optional interior- and/or exterior-facing image sensors 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 612 are configured to provide the XR experience to the user. In some implementations, the one or more XR displays 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 612 correspond to diffractive, reflective, polarized, holographic, etc. waveguide displays. For example, the electronic device 120 includes a single XR display. In another example, the electronic device includes an XR display for each eye of the user. In some implementations, the one or more XR displays 612 are capable of presenting MR and VR content.

In some implementations, the one or more image sensors 614 are configured to obtain image data that corresponds to at least a portion of the face of the user that includes the eyes of the user (any may be referred to as an eye-tracking camera). In some implementations, the one or more image sensors 614 are configured to be forward-facing so as to obtain image data that corresponds to the physical environment as would be viewed by the user if the electronic device 120 was not present (and may be referred to as a scene camera). The one or more optional image sensors 614 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 comprises a non-transitory computer readable storage medium. In some implementations, the memory 620 or the non-transitory computer readable storage medium of the memory 620 stores the following programs, modules and data structures, or a subset thereof including an optional operating system 630 and an XR presentation module 640.

The operating system 630 includes procedures for handling various basic system services and for performing hardware dependent tasks. In some implementations, the XR presentation module 640 is configured to present XR content to the user via the one or more XR displays 612. To that end, in various implementations, the XR presentation module 640 includes a data obtaining unit 642, a recentering unit 644, an XR presenting unit 646, and a data transmitting unit 648.

In some implementations, the data obtaining unit 642 is configured to obtain data (e.g., presentation data, interaction data, sensor data, location data, etc.) from at least the controller 110 of FIG. 1. To that end, in various implementations, the data obtaining unit 642 includes instructions and/or logic therefor, and heuristics and metadata therefor.

In some implementations, the recentering unit 644 is configured to update a transform between an application coordinate system and a world coordinate system. To that end, in various implementations, the recentering unit 644 includes instructions and/or logic therefor, and heuristics and metadata therefor.

In some implementations, the XR presenting unit 646 is configured to display the transformed image via the one or more XR displays 612. To that end, in various implementations, the XR presenting unit 646 includes instructions and/or logic therefor, and heuristics and metadata therefor.

In some implementations, the data transmitting unit 648 is configured to transmit data (e.g., presentation data, location data, etc.) to at least the controller 110. In some implementations, the data transmitting unit 648 is configured to transmit authentication credentials to the electronic device. To that end, in various implementations, the data transmitting unit 648 includes instructions and/or logic therefor, and heuristics and metadata therefor.

Although the data obtaining unit 642, the recentering unit 644, the XR presenting unit 646, and the data transmitting unit 648 are shown as residing on a single device (e.g., the electronic device 120), it should be understood that in other implementations, any combination of the data obtaining unit

642, the recentering unit 644, the XR presenting unit 646, and the data transmitting unit 648 may be located in separate computing devices.

Moreover, FIG. 6 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including a display, one or more processors, and non-transitory memory:
   obtaining a transform between a three-dimensional application coordinate system and a three-dimensional world coordinate system;
   determining a location of a virtual object in the three-dimensional application coordinate system;
   displaying, on the display, the virtual object at a location in a two-dimensional display coordinate system based on the location of the virtual object in the three-dimensional application coordinate system, the transform, and a first pose of the device;
   detecting a recentering trigger;
   in response to detecting the recentering trigger, updating the transform to an updated transform based on a second pose of the device; and
   displaying, on the display, the virtual object at an updated location in the two-dimensional display coordinate system based on the location of the virtual object in the three-dimensional application coordinate system, the updated transform, and a third pose of the device.

2. The method of claim 1, wherein the transform is a rotation-and-translation transform.

3. The method of claim 1, wherein determining the location of the virtual object in the three-dimensional application coordinate system includes determining one or more sets of three-dimensional coordinates in the three-dimensional application coordinate system.

4. The method of claim 3, wherein the one or more sets of three-dimensional coordinates in the three-dimensional application coordinate system includes an anchor location.

5. The method of claim 3, wherein the one or more sets of three-dimensional coordinates in the three-dimensional application coordinate system includes locations of one or more vertices of the virtual object.

6. The method of claim 1, wherein displaying the virtual object at the location in the two-dimensional display coordinate system includes:
   determining a location of the virtual object in the three-dimensional world coordinate system based on the location of the virtual object in the three-dimensional application coordinate system and the transform; and
   determining the location of the virtual object in the two-dimensional display coordinate system based on the location of the virtual object in the three-dimensional world coordinate system and the first pose of the device.

7. The method of claim 1, wherein the first pose of the device is an estimated pose of the device at a display time at which the virtual object is displayed at the location in the two-dimensional display coordinate system.

8. The method of claim 1, wherein detecting the recentering trigger includes detecting a user input.

9. The method of claim 8, wherein the user input includes pressing a physical button.

10. The method of claim 8, wherein the user input includes a voice command.

11. The method of claim 1, wherein detecting the recentering trigger is based on a location of the device in the three-dimensional application coordinate system.

12. The method of claim 1, wherein the second pose of the device is an estimated pose of the device at a trigger time at which the recentering request was detected.

13. The method of claim 1, wherein displaying the virtual object at the updated location in the two-dimensional display coordinate system includes:
determining a location of the virtual object in the three-dimensional world coordinate system based on the location of the virtual object in the three-dimensional application coordinate system and the updated transform; and
determining the location of the virtual object in the two-dimensional display coordinate system based on the location of the virtual object in the three-dimensional world coordinate system and the third pose of the device.

14. The method of claim 1, wherein the third pose of the device is an estimated pose of the device at an updated display time at which the virtual object is displayed at the updated location in the two-dimensional display coordinate system.

15. The method of claim 1, further comprising, in response to detecting the recentering trigger, updating the location of the virtual object in the three-dimensional application coordinate system.

16. The method of claim 1, further comprising, in response to detecting the recentering trigger, updating an additional transform between an additional three-dimensional application coordinate system and the three-dimensional world coordinate system.

17. The method of claim 1, further comprising:
displaying, on a second display, the virtual object at a location in a two-dimensional display coordinate system of the second display based on the location of the virtual object in the three-dimensional application coordinate system, the transform, and a first pose of the device; and
displaying, on the second display, the virtual object at an updated second location in the two-dimensional display coordinate system of the second display based on the location of the virtual object in the three-dimensional application coordinate system, the updated transform, and a third pose of the device.

18. A device comprising:
a display;
a non-transitory memory; and
one or more processors to:
obtain a transform between a three-dimensional application coordinate system and a three-dimensional world coordinate system;
determine a location of a virtual object in the three-dimensional application coordinate system;
display, on the display, the virtual object at a location in a two-dimensional display coordinate system based on the location of the virtual object in the three-dimensional application coordinate system, the transform, and a first pose of the device;
detect a recentering trigger;
in response to detecting the recentering trigger, update the transform to an updated transform based on a second pose of the device; and
display, on the display, the virtual object at an updated location in the two-dimensional display coordinate system based on the location of the virtual object in the three-dimensional application coordinate system, the updated transform, and a third pose of the device.

19. The device of claim 18, wherein the one or more processors are to detect the recentering trigger by detecting a user pressing a physical button.

20. A non-transitory memory storing one or more programs, which, when executed by one or more processors of a device including a display, cause the device to:
obtain a transform between a three-dimensional application coordinate system and a three-dimensional world coordinate system;
determine a location of a virtual object in the three-dimensional application coordinate system;
display, on the display, the virtual object at a location in a two-dimensional display coordinate system based on the location of the virtual object in the three-dimensional application coordinate system, the transform, and a first pose of the device;
detect a recentering trigger;
in response to detecting the recentering trigger, update the transform to an updated transform based on a second pose of the device; and
display, on the display, the virtual object at an updated location in the two-dimensional display coordinate system based on the location of the virtual object in the three-dimensional application coordinate system, the updated transform, and a third pose of the device.

* * * * *